(12) United States Patent
Katzer et al.

(10) Patent No.: US 9,619,810 B1
(45) Date of Patent: Apr. 11, 2017

(54) ZONE ARCHITECTURE FOR DYNAMIC TARGETED CONTENT CREATION

(75) Inventors: Robin Dale Katzer, Olathe, KS (US); Brian D. Mauer, Shawnee, KS (US); Carl J. Persson, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 737 days.

(21) Appl. No.: 13/271,207

(22) Filed: Oct. 11, 2011

(51) Int. Cl.
*G06Q 30/02* (2012.01)
*G06F 9/455* (2006.01)
*G06F 9/445* (2006.01)

(52) U.S. Cl.
CPC ............. *G06Q 30/02* (2013.01); *G06F 8/61* (2013.01)

(58) Field of Classification Search
CPC ............. G06Q 30/02; G06Q 30/0631; G06Q 30/0269; G06Q 30/0261; G06Q 30/0255; G06Q 30/0267; G06Q 30/0243; G06Q 30/0251; H04N 21/44222; H04N 21/812; H04N 21/6582
USPC ............ 455/405, 404.2, 456.1–456.3, 414.1, 455/414.2
See application file for complete search history.

(56) References Cited

U.S. PATENT DOCUMENTS

| | | | |
|---|---|---|---|
| 5,950,200 A | 9/1999 | Sudai et al. | |
| 6,064,975 A | 5/2000 | Moon et al. | |
| 6,186,553 B1 | 2/2001 | Phillips et al. | |
| 6,356,838 B1 | 3/2002 | Paul | |
| 6,441,831 B1 | 8/2002 | Abramowitz et al. | |
| 6,622,016 B1 | 9/2003 | Sladek et al. | |
| 6,647,260 B2 | 11/2003 | Dusse et al. | |
| 6,882,290 B2 | 4/2005 | French et al. | |
| 6,978,132 B1 | 12/2005 | Sladek et al. | |
| 6,986,107 B2 | 1/2006 | Hanggie et al. | |
| 7,031,437 B1 | 4/2006 | Parsons et al. | |
| 7,046,998 B2 | 5/2006 | Verma et al. | |
| 7,072,653 B1 | 7/2006 | Sladek et al. | |
| 7,073,130 B2 | 7/2006 | Novak et al. | |

(Continued)

FOREIGN PATENT DOCUMENTS

| | | |
|---|---|---|
| WO | 2009056148 A1 | 5/2009 |
| WO | 2014022446 A1 | 2/2014 |

OTHER PUBLICATIONS

Office Action—Restriction Requirement dated Feb. 1, 2012, U.S. Appl. No. 12/876,221, filed Sep. 6, 2010.

(Continued)

*Primary Examiner* — George Eng
*Assistant Examiner* — Jing Gao

(57) ABSTRACT

A method for providing dynamically-assembled content targeted to a mobile service subscriber. The method comprises receiving, by a server computer, information about a mobile device that is connecting to the server computer; determining, by the server computer, a mobile service subscriber profile, based on the information; determining, by the server computer, a criteria for selecting content, based on the mobile service subscriber profile; dynamically assembling, by the server computer, content for the mobile service subscriber based on the criteria; providing the dynamically-assembled content to the mobile device; monitoring a response of the mobile service subscriber to receiving the content; and providing information of the response of the mobile service subscriber to a content provider.

20 Claims, 7 Drawing Sheets

(56) References Cited

U.S. PATENT DOCUMENTS

| | | |
|---|---|---|
| 7,215,754 B1 | 5/2007 | Woodson et al. |
| 7,260,382 B1 | 8/2007 | Lamb et al. |
| 7,260,386 B1 | 8/2007 | Haldar et al. |
| 7,409,208 B1 | 8/2008 | Clare et al. |
| 7,500,198 B2 | 3/2009 | Mathews et al. |
| 7,552,432 B2 | 6/2009 | Aiba |
| 7,558,953 B2 | 7/2009 | Osthoff et al. |
| 7,681,134 B1 | 3/2010 | Grechishkin et al. |
| 7,702,322 B1 | 4/2010 | Maurya et al. |
| 7,788,593 B1 | 8/2010 | Grechishkin et al. |
| 7,930,636 B2 | 4/2011 | Garbow et al. |
| 7,970,386 B2 | 6/2011 | Bhat et al. |
| 8,012,219 B2 | 9/2011 | Mendez et al. |
| 8,150,962 B1 | 4/2012 | Wolter |
| 8,244,277 B1 | 8/2012 | Cha et al. |
| 8,265,658 B2 | 9/2012 | Issa et al. |
| 8,270,310 B2 | 9/2012 | Raleigh |
| 8,270,941 B2 | 9/2012 | Kenagy et al. |
| 8,315,198 B2 | 11/2012 | Corneille et al. |
| 8,359,016 B2 | 1/2013 | Lindeman et al. |
| 8,468,164 B1 | 6/2013 | Paleja et al. |
| 8,533,605 B1 | 9/2013 | Cha et al. |
| 8,538,398 B2 | 9/2013 | Wilson et al. |
| 8,559,933 B1 | 10/2013 | Delker et al. |
| 8,577,334 B1 | 11/2013 | Smith et al. |
| 8,577,737 B1 | 11/2013 | Amacker et al. |
| 8,583,091 B1 | 11/2013 | Delker et al. |
| 8,589,911 B1 | 11/2013 | Sharkey et al. |
| 8,650,096 B2 | 2/2014 | Van Buskirk et al. |
| 8,819,639 B2 | 8/2014 | Schumacher |
| 8,838,087 B1 | 9/2014 | Delker et al. |
| 8,843,122 B1 | 9/2014 | Wick et al. |
| 8,863,232 B1 | 10/2014 | Tidd |
| 8,954,041 B1 | 2/2015 | Delker et al. |
| 8,972,592 B1 | 3/2015 | Delker et al. |
| 9,043,446 B1 | 5/2015 | Davis et al. |
| 9,123,062 B1 | 9/2015 | Delker et al. |
| 9,189,607 B1 | 11/2015 | Wick et al. |
| 9,386,395 B1 | 7/2016 | Delker et al. |
| 9,413,839 B2 | 8/2016 | Annan et al. |
| 9,442,709 B1 | 9/2016 | Delker et al. |
| 9,483,253 B1 | 11/2016 | Schwermann et al. |
| 9,513,888 B1 | 12/2016 | Fultz et al. |
| 2002/0029169 A1 | 3/2002 | Oki et al. |
| 2002/0054086 A1 | 5/2002 | Van Oostenbrugge et al. |
| 2002/0054150 A1 | 5/2002 | I'Anson et al. |
| 2002/0101444 A1 | 8/2002 | Novak et al. |
| 2002/0123335 A1 | 9/2002 | Luna et al. |
| 2002/0142760 A1 | 10/2002 | Gidron et al. |
| 2002/0167542 A1 | 11/2002 | Florin |
| 2003/0233329 A1 | 12/2003 | Laraki et al. |
| 2004/0044752 A1 | 3/2004 | Hamaguchi et al. |
| 2004/0113940 A1 | 6/2004 | Brockway et al. |
| 2004/0148598 A1 | 7/2004 | Kita et al. |
| 2004/0171375 A1 | 9/2004 | Chow-Toun |
| 2004/0179034 A1 | 9/2004 | Burritt |
| 2004/0181678 A1 | 9/2004 | Lee et al. |
| 2004/0203941 A1 | 10/2004 | Kaplan et al. |
| 2004/0216054 A1 | 10/2004 | Mathews et al. |
| 2005/0050474 A1 | 3/2005 | Bells et al. |
| 2005/0055696 A1 | 3/2005 | Betzler et al. |
| 2005/0071780 A1 | 3/2005 | Muller et al. |
| 2005/0085272 A1 | 4/2005 | Anderson et al. |
| 2006/0048141 A1 | 3/2006 | Persson et al. |
| 2006/0085751 A1 | 4/2006 | O'Brien et al. |
| 2006/0092861 A1 | 5/2006 | Corday et al. |
| 2006/0150256 A1 | 7/2006 | Fanton et al. |
| 2006/0190569 A1 | 8/2006 | Neil et al. |
| 2006/0235760 A1 | 10/2006 | Sanjar et al. |
| 2006/0258289 A1 | 11/2006 | Dua |
| 2006/0277469 A1 | 12/2006 | Chaudhri et al. |
| 2007/0067738 A1 | 3/2007 | Flynt et al. |
| 2007/0088851 A1* | 4/2007 | Levkovitz et al. ........... 709/246 |
| 2007/0109580 A1 | 5/2007 | Yoshida |
| 2007/0130156 A1 | 6/2007 | Tenhunen et al. |
| 2007/0265023 A1 | 11/2007 | Bengtsson et al. |
| 2007/0268842 A1 | 11/2007 | Wang |
| 2007/0282914 A1 | 12/2007 | Sivapragasam et al. |
| 2008/0010133 A1 | 1/2008 | Pyhalammi et al. |
| 2008/0034309 A1 | 2/2008 | Louch et al. |
| 2008/0092057 A1 | 4/2008 | Monson et al. |
| 2008/0192714 A1 | 8/2008 | Kim et al. |
| 2008/0214172 A1 | 9/2008 | Anwer |
| 2008/0276182 A1 | 11/2008 | Leow |
| 2008/0305775 A1 | 12/2008 | Aaltonen et al. |
| 2008/0319887 A1 | 12/2008 | Pizzi et al. |
| 2009/0017870 A1 | 1/2009 | An |
| 2009/0077495 A1 | 3/2009 | Bhat et al. |
| 2009/0181716 A1 | 7/2009 | Benco et al. |
| 2009/0186651 A1 | 7/2009 | You |
| 2009/0228824 A1 | 9/2009 | Forstall et al. |
| 2009/0254753 A1 | 10/2009 | De Atley et al. |
| 2009/0260004 A1 | 10/2009 | Datta et al. |
| 2009/0288079 A1 | 11/2009 | Zuber et al. |
| 2009/0291674 A1 | 11/2009 | Choi |
| 2009/0307679 A1 | 12/2009 | Lee et al. |
| 2010/0005196 A1 | 1/2010 | Wolff-Petersen |
| 2010/0030901 A1 | 2/2010 | Hallberg et al. |
| 2010/0037204 A1* | 2/2010 | Lin et al. ........... 717/106 |
| 2010/0058431 A1 | 3/2010 | McCorkendale et al. |
| 2010/0060549 A1 | 3/2010 | Tsern |
| 2010/0087175 A1 | 4/2010 | Roundtree |
| 2010/0115438 A1 | 5/2010 | Chu |
| 2010/0121567 A1 | 5/2010 | Mendelson |
| 2010/0184422 A1 | 7/2010 | Ahrens |
| 2010/0190478 A1 | 7/2010 | Brewer et al. |
| 2010/0197219 A1 | 8/2010 | Issa et al. |
| 2010/0234051 A1 | 9/2010 | Holden et al. |
| 2010/0269107 A1 | 10/2010 | Jung et al. |
| 2010/0281427 A1 | 11/2010 | Ghosh et al. |
| 2011/0034160 A1 | 2/2011 | Corda et al. |
| 2011/0072121 A1 | 3/2011 | Takasugi et al. |
| 2011/0161149 A1 | 6/2011 | Kaplan |
| 2011/0161484 A1 | 6/2011 | Van den Bogaert et al. |
| 2011/0208822 A1* | 8/2011 | Rathod ........... G06Q 30/02 709/206 |
| 2011/0210933 A1 | 9/2011 | Forstall |
| 2011/0238496 A1* | 9/2011 | Gurbuxani et al. ....... 705/14.49 |
| 2011/0258301 A1 | 10/2011 | McCormick et al. |
| 2011/0295980 A1 | 12/2011 | Aldis et al. |
| 2011/0312387 A1* | 12/2011 | Heo ........... G06F 3/0481 455/566 |
| 2011/0314389 A1 | 12/2011 | Meredith et al. |
| 2012/0016735 A1 | 1/2012 | Park et al. |
| 2012/0054022 A1 | 3/2012 | Kosashvili |
| 2012/0072311 A1 | 3/2012 | Khan |
| 2012/0102428 A1 | 4/2012 | Stewart |
| 2012/0102547 A1 | 4/2012 | Fransdonk |
| 2012/0117478 A1 | 5/2012 | Vadde et al. |
| 2012/0155292 A1 | 6/2012 | Zazula et al. |
| 2013/0097654 A1 | 4/2013 | Aciicmez et al. |
| 2013/0275915 A1 | 10/2013 | Wang |
| 2013/0294307 A1 | 11/2013 | Johansson et al. |
| 2014/0036697 A1 | 2/2014 | Annan et al. |
| 2014/0047559 A1 | 2/2014 | Vera et al. |
| 2014/0127662 A1 | 5/2014 | Kron et al. |
| 2014/0173462 A1 | 6/2014 | Mattingly et al. |
| 2014/0298320 A1 | 10/2014 | Xu et al. |

OTHER PUBLICATIONS

FAIPP Office Action dated Jan. 24, 2014, U.S. Appl. No. 12/876,220, filed Sep. 6, 2010.
Office Action dated Dec. 26, 2013, U.S. Appl. No. 13/018,083, filed Jan. 31, 2011.
Advisory Action dated Nov. 22, 2013, U.S. Appl. No. 13/118,058, filed May 27, 2011.
Office Action dated Dec. 17, 2013, U.S. Appl. No. 13/031,123, filed Feb. 18, 2011.
Pre-Interview Communication dated Feb. 26, 2013, U.S. Appl. No. 13/023,486, filed Feb. 8, 2011.
Final Office Action dated Jan. 11, 2013, U.S. Appl. No. 12/876,221, filed Sep. 6, 2010.

(56) References Cited

OTHER PUBLICATIONS

Pre-Interview Communication dated Feb. 26, 2013, U.S. Appl. No. 13/118,058, filed May 27, 2011.
Office Action dated Mar. 14, 2013, U.S. Appl. No. 13/161,496, filed Jun. 16, 2011.
Delker, Jason R., et al., Patent Application entitled "Transition Experience During Loading and Updating an Interface and Applications Pack," filed Oct. 24, 2012, U.S. Appl. No. 13/659,889.
First Action Interview Pre-Interview Communication dated Apr. 24, 2012, U.S. Appl. No. 12/876,220, filed Sep. 6, 2010.
FAIPP Office Action dated May 10, 2012, U.S. Appl. No. 12/876,221, filed Sep. 6, 2010.
Notice of Allowance dated Mar. 30, 2012, U.S. Appl. No. 13/029,103, filed Feb. 16, 2011.
Notice of Allowance dated Jun. 4, 2013, U.S. Appl. No. 13/023,486, filed Feb. 8, 2011.
Advisory Action dated Apr. 23, 2013, U.S. Appl. No. 12/876,221, filed Sep. 6, 2010.
Notice of Allowance dated Jul. 2, 2013, U.S. Appl. No. 12/876,221, filed Sep. 6, 2010.
Final Office Action dated May 10, 2013 U.S. Appl. No. 13/018,083, filed Jan. 31, 2011.
First Action Interview Office Action dated May 6, 2013, U.S. Appl. No. 13/118,058, filed May 27, 2011.
Notice of Allowance dated Apr. 29, 2013, U.S. Appl. No. 13/537,563, filed Jun. 29, 2012.
Notice of Allowance dated Jun. 27, 2013, U.S. Appl. No. 13/161,496, filed Jun. 16, 2011.
Annan, Brandon C., et al., Patent Application entitled, "Traffic Management of Third Party Applications", filed Jul. 31, 2012, U.S. Appl. No. 13/536,709.
Ackerman, Samuel K., "Lecture Slides: Mapping User Interface Design to Culture Dimensions", Aaron Marcus and Associates, Inc., 2001.
Hollister, Sean, "Apple patent app hints at iPod-based phones, Peel 520 turns shades of green, red, blue and yellow," Engadget, http://www.engadgetcom/2010/09/19/apple-patent-app-hints-at-ipod-based-phones-peel-520-turns-shad/, Sep. 19, 2010, p. 1.
Kenja's Newsletter, About Newsletter, http://kenja.net/news.main.html, printed from the World Wide Web, "last modified Fri, Oct. 10, 2003".
Openwave, "Comparison of WAP Push and Short Message Service (SMS)," Openwave Systems, Inc., Redwood City, CA, Apr. 2002.
QUALCOMM, uiOne™, http://brew.qualcomm.com/brew/in/about/uione.html.
Scansoft press release, "Scansoft Launches SpeechPAK Healthcare Suite 2.0", http://dragontranscription.com/press-releases-articles-february-2005/scansoft-launches-speechpak-healthcare-suite-2.0.html, Feb. 17, 2005.
Stanford Technology Ventures Program, "Danger, Inc.: Powering the Next Generation of Mobile Technology", Oct. 15, 2003.
Office Action dated Apr. 15, 2008, U.S. Appl. No. 11/046,083, filed Jan. 28, 2005.
Final Office Action dated Oct. 28, 2008, U.S. Appl. No. 11/046,083, filed Jan. 28, 2005.
Office Action dated Aug. 15, 2011, U.S. Appl. No. 12/330,759, filed Dec. 9, 2008.
Office Action dated Aug. 3, 2008, U.S. Appl. No. 11/333,964, filed Jan. 17, 2006.
Final Office Action dated Oct. 8, 2008, U.S. Appl. No. 11/333,964, filed Jan. 17, 2006.
Final Office Action dated Jan. 21, 2009, U.S. Appl. No. 11/333,964, filed Jan. 17, 2006.
Advisory Action dated Apr. 13, 2009, U.S. Appl. No. 11/333,964, filed Jan. 17, 2006.
Office Action dated Jun. 23, 2009, U.S. Appl. No. 11/333,964, filed Jan. 17, 2006.
Final Office Action dated May 11, 2010, U.S. Appl. No. 11/333,964, filed Jan. 17, 2006.
Advisory Action dated Jul. 22, 2010, U.S. Appl. No. 11/333,964, filed Jan. 17, 2006.
Wolter, Eric, Patent Application entitled "Method and System for Calendar-Based Delivery of Themed User-Interface Skins," filed Dec. 9, 2008, U.S. Appl. No. 12/330,759.
Wolter, Eric S., Patent Application entitled "Method and System for Delivery of User-Interface Skins, Applications, and Services to Wireless Devices," filed Jan. 17, 2006, U.S. Appl. No. 11/333,964.
Delker, Jason R., et al., Patent Application entitled "Provisioning System and Methods for Interfaceless Phone," filed Sep. 6, 2010, U.S. Appl. No. 12/876,220.
Delker, Jason R., et al., Patent Application entitled "System and Method for ID Platform," filed Feb. 8, 2011, U.S. Appl. No. 13/023,486.
Delker, Jason R., et al., Patent Application entitled "Dynamic Loading, Unloading, and Caching of Alternate Complete Interfaces," filed Sep. 6, 2010, U.S. Appl. No. 12/876,221.
Delker, Jason R., et al., Patent Application entitled "Shared ID with Second Party," filed Jan. 31, 2011, U.S. Appl. No. 13/018,083.
Delker, Jason R., et al., Patent Application entitled "Extending ID to a Computer System," filed May 27, 2011, U.S. Appl. No. 13/118,058.
Davis, John M., et al., Patent Application entitled "Mirroring Device Interface Components for Content Sharing," filed Mar. 10, 2011, U.S. Appl. No. 13/045,292.
Cha, Tae-Woo, et al., Patent Application entitled "Device Experience Adaptation Based on Schedules and Events," filed Feb. 16, 2011, U.S. Appl. No. 13/029,103.
Smith, Nathan A., et al., Patent Application entitled "Restricted Testing Access for Electronic Device," filed Jun. 16, 2011, U.S. Appl. No. 13/161,496.
Delker, Jason R., et al., Patent Application entitled "Ad Sponsored Communication Pack," filed Feb. 18, 2011, U.S. Appl. No. 13/031,123.
Foreign Communication From a Related Counterpart Application—International Search Report and Written Opinion, PCT/US2013/052805 Oct. 4, 2013.
Advisory Action dated Aug. 6, 2013, Application U.S. Appl. No. 13/018,083, filed Jan. 31, 2011.
Final Office Action dated Sep. 10, 2013, U.S. Appl. No. 13/118,058, filed May 27, 2011.
Office Action—Restriction Requirement dated Aug. 26, 2013, U.S. Appl. No. 13/031,123, filed Feb. 8, 2011.
Delker, Jason R., et al., Patent Application entitled "System and Method for ID Platform," filed Sep. 5, 2013, U.S. Appl. No. 14/019,053.
Delker, Jason R., et al., Patent Application entitled "Dynamic Loading, Unloading, and Caching of Alternate Complete Interfaces," filed Sep. 30, 2013, U.S. Appl. No. 14/042,707.
Annan, Brandon C., et al., International Application entitled, "Traffic Management of Third Party Applications", filed Jul. 24, 2013, Serial No. PCT/US13/52805.
FAIPP Pre-Interview Communication dated Jul. 19, 2012, U.S. Appl. No. 13/018,083, filed Jan. 31, 2011.
Cha, Tae-Woo, et al., Patent Application entitled, "Device Experience Adaptation Based on Schedules and Events," filed Jun. 29, 2012, U.S. Appl. No. 13/537,563.
Notice of Allowance dated Aug. 13, 2014, U.S. Appl. No. 14/019,053, filed Sep. 5, 2013.
Office Action dated Sep. 23, 2014, U.S. Appl. No. 13/018,083, filed Jan. 31, 2011.
Notice of Allowance dated Oct. 22, 2014, U.S. Appl. No. 13/118,058, filed May 27, 2011.
Pre-Interview Communication dated Aug. 6, 2014, U.S. Appl. No. 13/045,292, filed Mar. 10, 2011.
First Action Interview Office Action dated Oct. 10, 2014, U.S. Appl. No. 13/045,292, filed Mar. 10, 2011.
Pre-Interview Communication dated Aug. 8, 2014, U.S. Appl. No. 13/659,889, filed Oct. 24, 2012.
First Action Interview dated Oct. 15, 2014, U.S. Appl. No. 13/659,889, filed Oct. 24, 2012.
Office Action dated Oct. 10, 2014, U.S. Appl. No. 13/031,123, filed Feb. 18, 2011.

(56) References Cited

OTHER PUBLICATIONS

Wick, Ryan A., et al., Patent Application entitled "Mobile Phone Controls Preprocessor" filed Sep. 3, 2014, U.S. Appl. No. 14/476,339.
Final Office Action dated Mar. 20, 2014, U.S. Appl. No. 12/876,220, filed Sep. 6, 2010.
Notice of Allowance dated May 6, 2014, U.S. Appl. No. 12/876,220, filed Sep. 6, 2010.
Pre-Interview Communication dated Mar. 28, 2014, U.S. Appl. No. 14/019,053, filed Sep. 5, 2013.
Final Office Action dated Apr. 3, 2014, U.S. Appl. No. 13/018,083, filed Jan. 31, 2011.
Advisory Action dated Jun. 9, 2014, U.S. Appl. No. 13/018,083, filed Jan. 31, 2011.
Office Action dated Mar. 18, 2014, U.S. Appl. No. 13/118,058, filed May 27, 2011.
Pre-Interview Communication dated Mar. 21, 2014, U.S. Appl. No. 13/537,610, filed Jun. 29, 2012.
Notice of Allowance dated May 18, 2014, U.S. Appl. No. 13/537,610, filed Jun. 29, 2012.
Wick, Ryan A., et al., Patent Application entitled "Mobile Phone Controls Preprocessor" filed Jun. 29, 2012, U.S. Appl. No. 13/537,610.
Foreign Communication From a Related Counterpart Application—International Preliminary Report on Patentability dated Feb. 12, 2015, PCT/US2013/052805 filed on Jul. 24, 2013.
Supplemental Notice of Allowance dated Dec. 3, 2014, U.S. Appl. No. 13/118,058, filed May 27, 2011.
Notice of Allowance dated Jan. 6, 2015, U.S. Appl. No. 13/045,292, filed Mar. 10, 2011.
Office Action dated Dec. 17, 2014, U.S. Appl. No. 13/563,709, filed Jul. 31, 2012.
Final Office Action dated Jun. 23, 2015, U.S. Appl. No. 13/563,709, filed Jul. 31, 2012.
Pre-Interview Communication dated Jun. 8, 2015, U.S. Appl. No. 14/476,339, filed Sep. 3, 2014.
Notice of Allowance dated Jul. 16, 2015, U.S. Appl. No. 14/476,339, filed Sep. 3, 2014.
Advisory Action dated Jul. 27, 2015, U.S. Appl. No. 13/659,889, filed Oct. 24, 2012.
FAIPP Pre-Interview Communication dated Jul. 24, 2015, U.S. Appl. No. 14/168,007, filed Jan. 30, 2014.
Fultz, David K., et al., "Virtual Preloads," filed Jan. 30, 2014, U.S. Appl. No. 14/168,007.
Final Office Action dated May 18, 2015, U.S. Appl. No. 13/659,889, filed Oct. 24, 2012.
Notice of Allowance dated Apr. 22, 2015, U.S. Appl. No. 13/031,123, filed Feb. 18, 2011.
Schwermann, Nathan M., et al., entitled "Methods for Customization of Default Applications on a Mobile Communication Device," filed Apr. 30, 2015, U.S. Appl. No. 14/701,156.
Pre-Interview Communication dated Dec. 1, 2015, U.S. Appl. No. 14/042,707, filed Sep. 30, 2013.
Notice of Allowance dated Feb. 8, 2016, U.S. Appl. No. 14/042,707, filed Sep. 30, 2013.
Advisory Action dated Jan. 29, 2016, U.S. Appl. No. 13/563,709, filed Jul. 31, 2012.
Office Action dated Dec. 1, 2015, U.S. Appl. No. 13/659,889, filed Oct. 24, 2012.
Final Office Action dated Jan. 28, 2016, U.S. Appl. No. 14/168,007, filed Jan. 30, 2014.
Final Office Action dated Feb. 8, 2016, U.S. Appl. No. 14/701,156, filed Apr. 30, 2015.
Office Action dated Sep. 15, 2015, U.S. Appl. No. 13/563,709, filed Jul. 31, 2012.
Office Action dated Oct. 1, 2015, U.S. Appl. No. 14/701,156, filed Apr. 30, 2015.
Notice of Allowance dated Mar. 1, 2016, U.S. Appl. No. 13/563,709, filed Jul. 31, 2012.
Notice of Allowance dated May 4, 2016, U.S. Appl. No. 13/659,889, filed Oct. 24, 2012.
Advisory Action dated Mar. 29, 2016, U.S. Appl. No. 14/168,007, filed Jan. 30, 2014.
Office Action dated Apr. 14, 2016, U.S. Appl. No. 14/168,007, filed Jan. 30, 2014.
Advisory Action dated Apr. 15, 2016, U.S. Appl. No. 14/701,156, filed Apr. 30, 2015.
Notice of Allowance dated Aug. 3, 2016, U.S. Appl. No. 14/168,007, filed Jan. 30, 2014.
Notice of Allowance dated Jun. 20, 2016, U.S. Appl. No. 14/701,156, filed Apr. 30, 2015.

* cited by examiner

ZONE ARCHITECTURE FOR DYNAMIC TARGETED CONTENT CREATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication service providers such as cell phone service providers, internet service providers, and the like may deliver tailored offerings and/or services to subscribers in order to instill brand loyalty and/or customer satisfaction. They may send content specifically targeted to a subscriber or group of subscribers, such as sending electronic coupons for savings on toddler clothing to young parents, or delivering electronic invitations to sporting events to identified sports fans. Service providers may also offer special platform environments that are tailored for and/or configurable to the tastes or preferences of certain groups of subscribers. For example, they may offer screen savers or wallpapers for cell phone displays or computer monitors that display themes of particular interest to subscribers, such as underwater scenes for subscribers that are scuba diving enthusiasts, or nature scenes that may appeal to outdoors enthusiasts. In addition to simple screen savers, service providers may provide theme-based applications that may coincide with the preferences of the service subscriber on a more personalized level. Appealing to subscribers on a more personalized basis may be a value-added process that may generate brand loyalty and/or may help distinguish a service provider from its competition.

SUMMARY

In an embodiment, a method of zone architecture for dynamic targeted content is disclosed. The method comprises providing dynamically-assembled content targeted to a mobile service subscriber comprising receiving, by a server computer, information of a mobile device that is connecting to the server computer; determining, by the server computer, a mobile service subscriber profile, based on the collected information; determining, by the server computer, criteria for selecting content, based on the mobile service subscriber profile; dynamically assembling, by the server computer, content for the mobile service subscriber based on the criteria; providing the dynamically-assembled content to the service subscriber; monitoring a response of the mobile service subscriber to receiving the content; and providing information of the response of the mobile service subscriber to a content provider.

In an embodiment, a system for zone architecture for dynamic targeted content is disclosed. The system comprises providing targeted content to a mobile service subscriber comprising at least one computer comprising a content management system operable to manage content from a content provider; a backend processing queue operable to process executable markup language information related to the mobile service subscriber; a base marketing warehouse operable to store processed information of the mobile service subscriber; a customer intelligence platform operable to process information of the mobile service subscriber and send the processed data to the base marketing warehouse; and a zone server operable to accept mobile device connections from a mobile service subscriber, receive information of the mobile service subscriber from the mobile device, accept content from one or more of the content management system and the backend processing queue, dynamically assemble executable markup language from the input based at least in part on the information of the mobile service subscriber, and transmit the content to the mobile service subscriber, monitor a response of the mobile service subscriber to receiving the content; and provide information of the response of the mobile service subscriber to the content provider.

In an embodiment, a method of zone architecture for dynamic targeted content is disclosed. The method comprises filtering content to provide to a mobile service subscriber comprising receiving, by at least one server computer, information of a mobile device that is connecting to the at least one server computer; determining, by the at least one server computer, a mobile service subscriber profile, based on the collected information; determining, by the at least one server computer, criteria for selecting content, based on the mobile service subscriber profile; filtering, by the at least one server computer, content from a base marketing warehouse to be provided to the mobile service subscriber based on the criteria, wherein the content in the base marketing warehouse is provided by a content provider; dynamically assembling, by the at least one server computer, the content for the service subscriber based on the filtering; and providing the dynamically-assembled content to the mobile service subscriber, monitor a response of the mobile service subscriber to receiving the content; and provide information of the response of the mobile service subscriber to the content provider.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
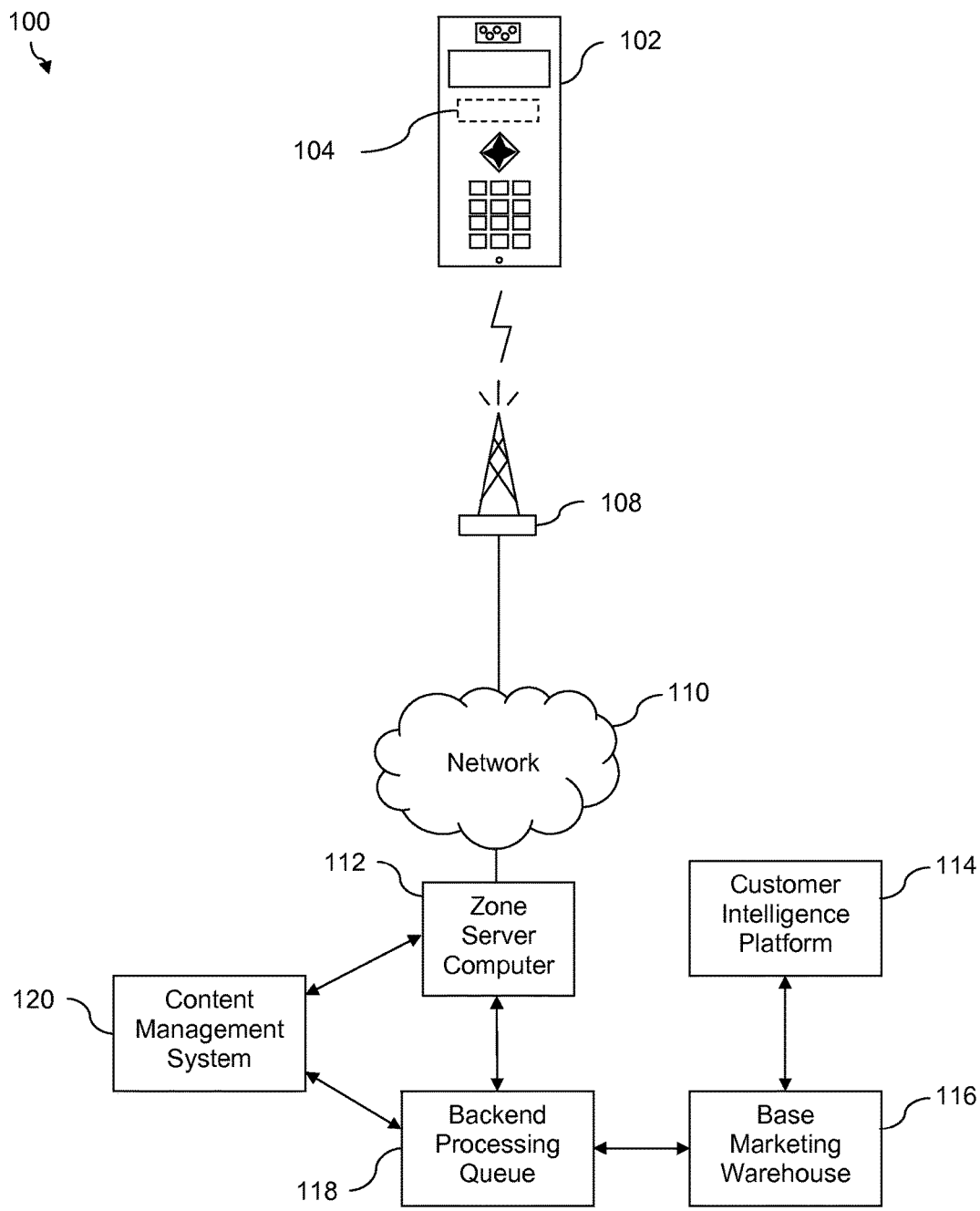
FIG. 1 illustrates a targeted content delivery system, according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system and methods are disclosed. The system and methods provide the ability to custom tailor and deliver (e.g. target) content to mobile communication service subscribers that is personalized, to some degree, to a subscriber, or a group of service subscribers, based on a plurality of criteria. The criteria may include, but are not limited to handset make, handset model, network access identifier, software version such as operating system version, and which interface and applications packs (IAP's) are installed and/or currently active on the phone. As used herein, the term "installed", with reference to interface and application packs, is used to describe the interface and application pack or packs that have been installed onto the phone, but which may not, at any given time, be actively in use on the phone. Likewise, the terms "currently active" and/or "active" are used to describe the one interface and application pack that is currently in use by the phone. By way of example, a user of a computer such as a desktop computer may have a variety of desktop wallpaper files available for displaying on their desktop computer monitor. The user of the computer may have a wallpaper of a mountain scene active (e.g. in use) one day, and on another day they may choose to have an image of a beach scene on their desktop computer monitor, and so may activate that image for display. In a similar manner, a user of a mobile phone may have a number of interface and application packs installed on their mobile phone, but may have any one of them active at any given moment. These and other criteria may be used to target content to the mobile service subscriber or to a group of mobile service subscribers in order to personalize the user experience of the mobile service subscribers.

As used herein, the term "content" may be used to describe any type of subject matter, executable markup language (XML), media, published material, applications, web content, web feeds such as Really Simple Syndication (RSS) feeds, value-added information or services, images including still images and video, text, audio including voice, sounds, and music, and/or any other form of content which may be suitable for delivery to a mobile service subscriber via a mobile device. In addition, content may be provided by a content provider that is a part of a mobile service provider, or the content may be provided by a third party content provider.

Given the nature of mobile devices and/or mobile service subscribers, the state or status of a mobile device may change relatively frequently. For example, a user of a mobile device (e.g. a mobile service subscriber) may have a variety of profiles (e.g. interface and application packs) that they may employ on their mobile device, such that the screen appearance, the form factors, the mode, and so on of the mobile device may be altered or modified, even on the fly, by the mobile service subscriber. The profile that is in use at any given time may dictate the type or style of content that may be suitable to receive and/or display on a mobile device. For example, a mobile service subscriber that is a sports fan may have a particular profile for his/her mobile device that displays a logo of his/her favorite football team. In addition, this particular profile may modify the audible tones associated with the device. For example, when such as the tone the mobile device emits when receiving a phone call when this particular profile is invoked, it may play an audio file of the fight song of the team whose logo is being displayed, or such. The user experience of the phone may change on days when a professional football game is played, may change again during a week day because of a work schedule, may change again during the evening because of a child's school activities, and may change again on a weekend when no football game is scheduled.

When a given profile is active on a mobile device, it may be appropriate to send certain content. Using the above example, when a mobile service subscriber connects to a server, and the service subscriber has an active profile relating to their favorite football team, it may be appropriate to send the service subscriber content relating to recent football scores that may be of interest to the service subscriber. Other content may be appropriate for different profiles and or other current arrangements and/or configurations of a mobile device and/or a service subscriber. Determining the current arrangement and/or configuration of the mobile device may assist in targeting and/or delivering certain content to the mobile device of a given service subscriber, at any given time.

This is different than, for example, when a returning customer logs onto a merchant website, and the merchant website recognizes the customer, accesses historical information about the customer from a database of the merchant, and presents content that the merchant thinks is relevant to the customer. In this scenario, however, the information the merchant draws from their database is historical, and not necessarily current. The customer may have changed many things, since the last time they visited the merchant's website. Therefore, the historical information in the merchant's database may not be relevant to the customer at all, as the customer's likes, dislikes, needs, desires, tastes, and so on may have changed since the database entry was created. Determining the current arrangement and/or configuration of the mobile device may more accurately reflect the current profile of the customer, and may facilitate more appropriate content targeting than might be achieved by using historical information.

In addition, a mobile communication service provider may monitor and/or track information of a mobile service subscriber such as the mobile service subscriber's response to receiving content, a browsing history of the mobile communication service subscriber (e.g. websites the subscriber has visited, types of items the subscriber has purchased, online subscriptions the subscriber has, frequently-visited websites, and such) and may use the information to establish patterns of behaviors that may be useful for predicting the future needs, desires, likes, dislikes, and so on for an individual mobile service subscribers and/or a group of mobile service subscribers. In an embodiment, information pertaining to the mobile service subscriber's response to receiving the content may be captured, and may also be provided as feedback to a content provider. The content provider may then use the feedback to, for example, tailor or adjust the content they provide.

In another embodiment, a mobile service provider may select information to deliver to mobile service subscribers that the mobile service provider feels may be of particular interest to a mobile service subscriber or group of mobile service subscribers. For example, a mobile service provider may be associated with a company that sells infant care products (e.g. Company A). Company A may want to solicit business by providing coupons to targeted customers. The mobile service provider may be able to glean information from the database described above to select mobile service subscribers that fit the demographic that would best fit the profile of the customer Company A wishes to target. For example, a mobile service provider may scrutinize a database of mobile service subscriber information and may identify/select a group of mobile service subscribers that are parents of infant children that reside in a geographic location that is served by a store location of Company A. Electronic coupons could then be sent to the mobile service subscribers that fit the desired profile that Company A wishes to target (e.g. the parents of infant children that live close to a store location of the Company A). This may provide a more efficient way of distributing coupons and/or other content in a targeted manner that reduces the waste that occurs from broadcasting content (e.g. coupons) to recipients, some of whom may not even be likely to be viable customers (e.g. sending baby food coupons to single people or the elderly).

In yet another embodiment, the system and method provide a way to tailor content to specific portable communication platforms (e.g. mobile phones). For example, content may be formatted so as to "fit" onto a variety of portable communication platforms. By identifying the portable communication device by its salient parameters (e.g. make, model, operating system, etc.), as described above, content may be adjusted and/or formatted to fit a variety of portable communication devices and to then display appropriately, such as on the display of a mobile phone. Content may be resized, reshaped, the aspect ratio may be adjusted, and font sizes may be changed, and so on, in order to facilitate improved visualization of content for the portable communication device to which it is sent.

Turning now to FIG. 1, a system 100 for zone architecture for dynamic targeted content is shown. In an embodiment, the system 100 comprises a mobile device 102, indicia 104, a base transceiver station (BTS) 108, a network 110, a zone server computer 112, a customer intelligence platform 114, a base marketing warehouse 116, a backend processing queue 118, and a content management system 120. While illustrated as a mobile phone, mobile device 102 may also be a wireless handset, a pager, a personal digital assistant (PDA), a gaming device, or a media player. For the sake of discussion, mobile device 102 will hereinafter be referred to as mobile phone 102, with the understanding that it may embody any form of mobile device suitable for the purposes described in the disclosure. Indicia 104 may be information describing mobile phone 102. Indicia 104 may comprise identification information such as the make (e.g. brand) of the mobile phone 102, the model of mobile phone 102, the network access identification (NAI) associated with mobile phone 102, the operating system (OS) version of mobile phone 102, which interface and applications packs are installed on mobile phone 102, which interface and applications pack is currently active on mobile phone 102, display parameters such as screen size, resolution, number of characters capable of displaying, and/or any other information that may suitably describe mobile phone 102. Indicia 104 may be provided in the form of information stored within a memory of mobile phone 102.

An interface and applications pack (IAP) comprises at least one of a media file, an application, a web widget, and a network service and may be used to customize the communication experience of using an electronic device. In an embodiment, the interface and applications pack comprises at least two of these enumerated elements. In another embodiment, the interface and applications pack comprises at least three of these enumerated elements. An interface and applications pack may be viewed as an aggregated set of applications, web widgets, network services, ring tones, ringback tones, alerting tones, wallpapers, interface controls, and other content targeted for the electronic device. In some contexts, the interface and applications pack may be referred to as an ID pack.

As an example, but not by way of limitation, an interface and applications pack may be produced by an enterprise such as a retail outlet or a media business to promote its business interests to wireless communication service subscribers. The interface and applications pack, when active on an electronic device, may provide a control to select a store mapping web widget that provides a map of the location of products within a retail store, where the map of the store is dynamically downloaded by the web widget based on a physical location of the electronic device and based on known locations of the retail stores operated by the enterprise. The map web widget may provide a control to select a search utility for finding the location of a specific product within a store.

The interface and applications pack may provide an application that automatically generates an electronic coupon and posts a notification about the coupon in a notifications display area of the electronic device. The application may generate the coupon and post the related notification based on determining that the physical location of the electronic device is in the proximity of a known retail store operated by the enterprise. Alternatively, the application may generate the coupon based on the passage of a period of time without the subscriber of the electronic device making a purchase from the enterprise and based on the day of the week, for example a Saturday when the subscriber of the electronic device has most often made purchases from the enterprise in the past. In an embodiment, the application may determine when the electronic device is in a retail store operated by the enterprise, establish a communication link with a corresponding application executing on a server in the retail store, and receive information about purchases made by the subscriber of the electronic device. This purchase information may be used in the process of generating coupons described above.

The interface and applications pack may provide controls to access a network application that promotes participation in relevant social media, for example to participate in a home improvement discussion forum sponsored by the subject retail store, to post photographs of home improvement projects the user has completed, and to post descriptions of the materials used and/or innovations applied to overcome peculiar problems. The interface and applications pack may provide controls to select videos posted to the home improvement social media site, for example video showing fundamental techniques of using tools.

The interface and applications pack may provide media files that define wall papers and themes that change the look and sounds of the electronic device. For example, the interface and applications pack may include an audio file that defines an aural alert associated with receiving a short message service (SMS) message that is the sound of hammering. For example, the interface and applications pack may include a picture file that defines the background of the display of the electronic device to be a photographic view of picturesque mountains seen through a 2x4 frame structure for a storage shed. These examples are provided to suggest the scope and power of the interface and applications pack construct, but it is understood that a great variety of implementations of the interface and applications pack are contemplated by the present disclosure. The interface and applications pack may include alerting tones that are played when selected events occur to alert a user, for example to alert the user that a simple message service (SMS) message has been received or to alert the user to an event or the approach of an event germane to the subject interface and applications pack.

The interface and applications pack may provide interface controls for selecting functionality provided as part of the interface and applications pack as well as for selecting functionality that may be provided by the electronic device independently of the interface and applications pack. For example, the interface and applications pack may provide a control for invoking an address book widget that is provided by the firmware of the electronic device or for invoking a voice call dialing functionality. Interface controls provided by the interface and applications pack that invoke functions provided by the electronic device itself, for example provided in firmware of the electronic device, may be referred to as encapsulated controls. Such encapsulation of controls by the interface and applications pack may promote a more complete adaptation of the communication experience.

The interface and applications pack further comprises an automatic self-installation routine that provides a user-friendly means to "stand up" the interface and applications pack for the electronic device. The self-installation routine may download applications, web widgets, ring tones, wallpapers, and other content to the electronic device. The self-installation routine may include instructions to automatically configure the device's home screens such as shortcuts, bookmarks, and widget placement. In an embodiment, a portion of the self-installation routine may execute partly in the network to provision and/or initialize network services, ringback tones, and other network-provided functionality associated with the interface and applications pack. For example, a portion of the self-installation routine may initialize and/or provision voice-mail changes. The portion of the self-installation routine that executes on the electronic device may invoke the portion of the self-installation routine that executes in the network. In an embodiment, a portion of the self-installation routine may be provided by a utility built into the basic firmware or software library of the electronic device and another portion of the self-installation routine may be provided as part of the specific interface and applications pack.

The interface and applications pack is experienced, at one level of abstraction, as a unity. For example, when a user selects an interface and applications pack for installation on the electronic device, the user may perform a single selection action, and the self-installation routine may perform a number of separate and distinct actions to stand-up the selected interface and applications pack that are not observed by the user. When the user selects an interface and applications pack to be active, a currently active interface and applications pack may be deactivated and the various distinct components of the selected interface and applications pack may be brought into operation as a single global action, mediated by the automatic self-installation routine. The unity of experience may be further promoted by interactions among the several components of the interface and applications pack. For example, selection of controls in a web widget of the interface and applications pack may invoke playback of audios stored in media files of the interface and applications pack; for example, execution of an application of the interface and applications pack may trigger a modification of the wallpaper presented as a backdrop for the display of the electronic device.

An interface and applications pack may be tested to assure that the aggregation of media files, applications, web widgets, and network services interact appropriately with each other and do not impair other functionality of the electronic device. The testing may verify that the interface and applications pack interoperates with a range of different electronic devices, standard firmware, and/or standard applications. In an embodiment, the service provider may impose a constraint that interface and applications packs are provided to the electronic device from a controlled content source so that the service provider can exercise oversight and quality control of interface and applications packs. For further details about interface and applications packs (e.g. interface and applications packs), see U.S. patent application Ser. No. 12/876,220, filed Sep. 6, 2010, entitled "Provisioning System and Methods for Interfaceless Phone," by Jason R. Delker, et al.; U.S. patent application Ser. No. 13/023,486, filed Feb. 8, 2011, entitled "System and Method for ID Platform," by Jason R. Delker, et al.; U.S. patent application Ser. No. 12/876,221, filed Sep. 6, 2010, entitled "Dynamic Loading, Unloading, and Caching of Alternate Complete Interfaces," by Jason R. Delker, et al.; and U.S. patent application Ser. No. 13/118,058 filed May 27, 2011, entitled "Extending ID to a Computer System," by Jason R. Delker, et al., all of which are incorporated herein by reference in their entirety.

The BTS 108 may provide transmitting and receiving radio signals via equipment such as antennas, transceivers, and/or equipment for encrypting and/or decrypting communications between entities and/or locations. The BTS 108 may have several transceivers which allow it to serve multiple frequencies and different sectors of a communications cell. The BTS 108 is generally controlled by a parent via a base station control function, which is implemented as a discrete unit or incorporated into a transceiver. The functions of the BTS 108 may vary, depending on the cellular technology used and the cellular telephone provider, but the function of receiving/retransmitting signals as in mobile phone calls and/or messages, is generally the same across various forms of the BTS 108. The BTS 108 and similar systems are generally equipped with radios that are able to modulate frequencies for Global System for Mobile communication signals such as GSM, GSM 2G+, GSMK, 8-PSK, and the like, as appropriate for a given situation. Mobile phone 102 may be configured to connect wirelessly to a network such as network 110 via, for example, BTS 108 or any combination of BTS's, as might be appropriate in a given circumstance. Mobile phone 102 may thereby be availed of access to network 110 and also to zone server computer 112, each of which may be communicatively coupled to network 110 in any suitable manner.

In an embodiment, zone server computer 112 may be communicatively coupled to network 110, through which it may be communicatively coupled to mobile phone 102, via BTS 108. Zone server computer 112 may receive a communication request from mobile phone 102 and a communicative couple between zone server computer 112 and mobile phone 102 may thereby be established. Zone server computer 112 may by operable to interact with a plurality of different types, brands, styles, models and/or other distinctions of mobile devices. As such, zone server computer 112 may use defining information for each device that connects to it. When a connection attempt is initiated, for example by mobile phone 102, zone server computer 112 may query mobile phone 102 for identification information. Mobile phone 102 may, in response to the query, send indicia 104 to zone server computer 112. Zone server computer 112 may analyze the information of indicia 104 to facilitate interactions with mobile phone 102. The information of indicia 104 may allow zone server computer 112 to tailor various parameters such as communications protocols, display parameters, to facilitate interactions with mobile phone 102.

In an embodiment, each time a mobile service subscriber connects to zone server computer 112, zone server computer 112 may again request information (e.g. indicia 104) from the device of the mobile service subscriber. Given the nature of some of the information supplied in indicia 104 (e.g. the interface and applications pack that is currently active), the information of indicia 104 may not always be the same, every time the device connects to zone server computer 112. For example, a mobile service subscriber may have a plurality of interface and applications packs installed on their mobile phone 102. At any given time, a different interface and applications pack may be active on mobile phone 102; hence the information of indicia 104 may vary from time-to-time, depending on a variety of factors relating to mobile phone 102.

Zone server computer 112 may also be communicatively coupled to backend processing queue 118. Backend processing queue 118 is operable to process content such as executable markup language (XML) content which may subsequently be passed on to other components of system 100 for processing, handling, and/or distribution. One function of backend processing queue 118 may be to receive information pertaining to the historical operation of mobile phone 102. For example, backend processing queue 118 may receive information describing the websites that the mobile phone 102 has visited, what internet searches the mobile phone 102 has conducted, what items or types of products have been purchased via mobile phone 102, and so on. Backend processing queue 118 may gather this information, perform operations such as sorting, parsing, or other operations on the information and may temporarily store the information for passing along to other components of system 100.

Zone server computer 112 and backend processing queue 118 may also be communicatively coupled to content manager 120. Content manager 120 may be operable to receive, store and send content to zone server computer 112 and/or backend processing queue 118. Content manager 120 may also be configured to receive content from various sources and may further comprise a web portal for receiving said content. In an embodiment, content generated in-house and/or third party content may be gathered and managed by content manager 120. For example, a mobile service provider may generate content to provide to mobile service subscribers. Content such as news, weather, sports, product-specific information, applications, and/or other types of content may be generated and/or gathered for distribution by a mobile service provider to its customers and/or potential customers in an attempt to improve the customer experience of the mobile service subscribers. By providing this "service" to its customers, a mobile service provider may create customer loyalty and/or brand differentiation to help maintain or grow market share. In an embodiment, this content may be distributed in a targeted manner, such that content of interest to particular mobile service subscribers or groups of mobile service subscribers are sent content which, in some way, is of particular interest to them. Delivering targeted content to mobile service subscribers may be considered a value-added feature, and may reduce the frustration mobile service subscribers may experience from receiving randomly-distributed content which may or may not be of any interest to them. Targeting content to selected mobile service subscribers may help prevent this frustration and improve the efficiency of things such as advertising content by helping ensure that the content is provided to the mobile service subscribers to whom it most closely pertains.

In an embodiment, the content management system 120 may further be configured to accept content from third parties (e.g. those not directly associated with or under the purview of a mobile service provider). Third parties may be permitted to submit content for distribution to mobile service providers via content management system 120 of system 100. For example, a software developer may create an application that he/she may wish to distribute to mobile service subscribers and/or mobile phone users. It may be beneficial to the software developer to distribute their software through an established channel such as through a mobile service provider, rather than trying to distribute it themselves, as they may not have access to the customer base the mobile service provider has. In this case, the software developer may submit their content, via content management system 120, to the mobile service provider. The content management system 120 may then, upon clearing the content for use, distribute the content in any suitable manner as may be appropriate for a given situation, such as in a targeted manner to specific mobile service subscriber and/or group of mobile service subscribers.

Content management system 120 and backend processing queue 118 may be further communicatively coupled to each other. As such, backend processing queue 118 may provide processing of content to, for example, configure content to be distributed to mobile service subscribers. Content may be communicated back and forth between content management system 120 and backend processing queue 118 via any appropriate means, as would be known to one of ordinary skill in the art. In addition or alternatively, content may be stored in, for example, base marketing warehouse 116. Base marketing warehouse 116 may be operable to receive, store, and communicate content back and forth from backend processing queue 118. Base marketing warehouse 116 may then, in effect, serve as a data store for content which has been processed by backend processing queue 118. Base marketing warehouse 116 may also be communicatively coupled to content management system 120, and/or other components of system 100 in order to facilitate the storage, sharing, and/or distribution of content.

Customer intelligence platform 114 may be communicatively coupled to other components of system 100, such as base marketing warehouse 116. Customer intelligence platform 114 may be operable to facilitate targeting of content to customers such as mobile service subscribers via, for example, zone server computer 112. Customer intelligence platform 114 may employ information of specific mobile service subscribers and/or groups of mobile service subscribers based on any of a variety of information such as behavior, demographics, history, and such, in order to help direct content appropriately. Customer intelligence platform 114 may be provided with software, firmware, routines, algorithms, and such that may process information of content and mobile service subscribers in order to help improve the efficiency of the distribution of content to the appropriate targets (e.g. mobile service subscribers).

In an embodiment, the components and operations of system 100 may be arranged and configured to provide a means to gather, process, store, and distribute content in a manner to improve the likelihood of distributing content to the most appropriate entity or entities in order to improve the customer experience and increase the effectiveness of content delivery for a variety of purposes, such as targeted advertising and such.

Figure 2:
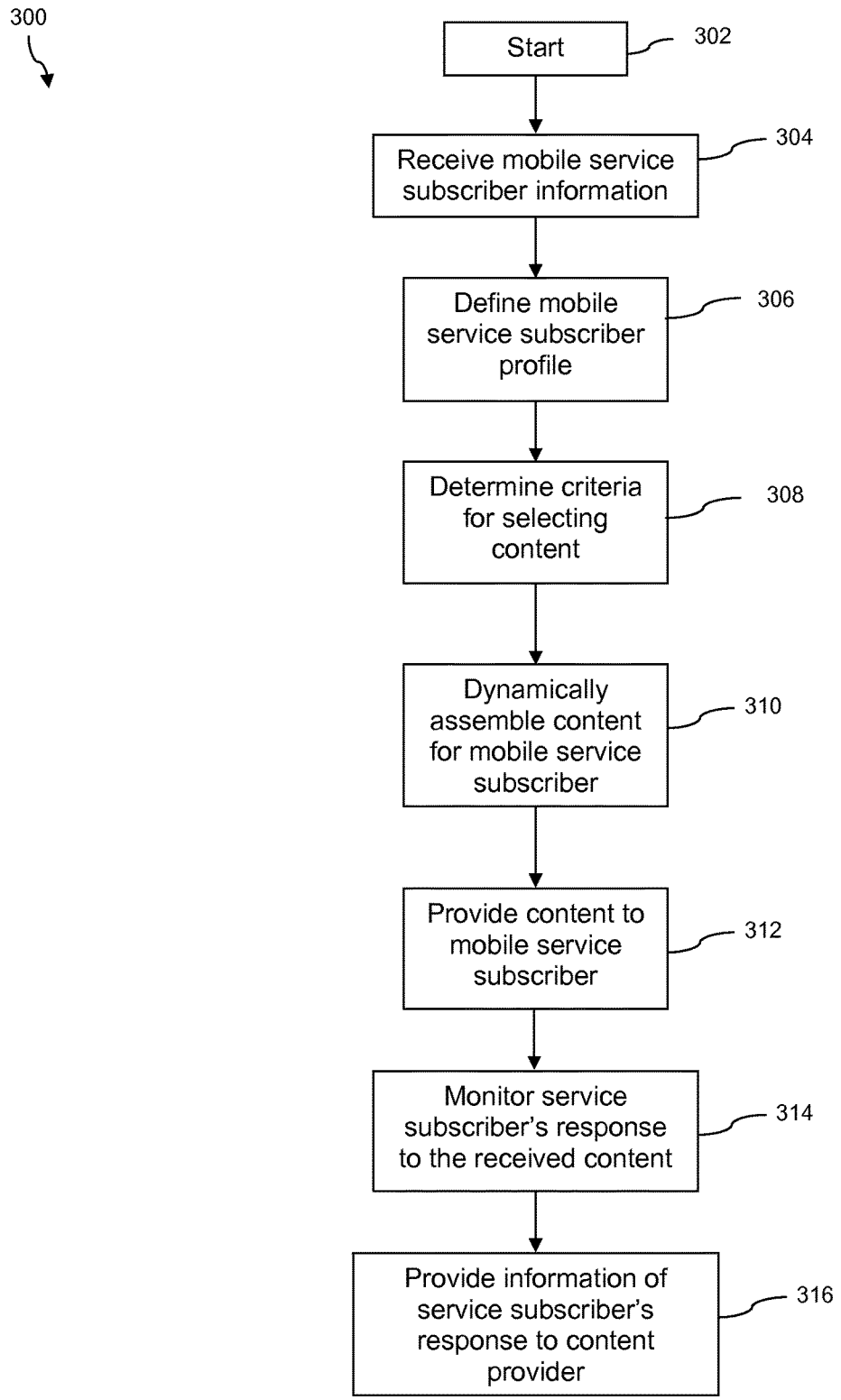
FIG. 2 illustrates a flowchart of a method, according to an embodiment of the disclosure.

Turning now to FIG. 2, a method 300 is illustrated. At step 302, method 300 begins (e.g. starts). At step 304, mobile service subscriber information is received. In an embodiment, a mobile device such as mobile phone 102 may contact zone server 112 via, for example, network 110 and BTS 108. Upon indication of a connection request, zone server computer 112 may request identification information (e.g. indicia 104) from mobile phone 102. In response to this request, mobile phone 102 may send indicia 104 to zone server computer 112. At step 306, zone server computer 112 may receive and analyze indicia 104 and may use the information provided therein to define a mobile service subscriber profile. The analysis may include, for example, parsing, sorting, or otherwise scrutinizing indicia to locate and assimilate the information included within indicia 104. The mobile service subscriber profile may include information about the mobile service subscriber such as demographic information, internet browsing history, age, gender, and/or any such information as may be useful and/or appropriate to define a suitable profile of the mobile service subscriber. This information may be provided by indicia 104, and/or may be available from other resources such as a database of the mobile service provider that maintains customer information. This additional information may be available to system 100, as one of ordinary skill in the art would appreciate.

In an embodiment, the step of analyzing indicia 104 may be repeated each time mobile phone 102 connects to zone server computer 112. In addition or alternatively, the analysis of indicia 104 may be repeated whenever mobile phone 102 is refreshed, for example when a user of mobile phone 102 manually (or automatically) refreshes mobile phone 102. A refresh may be conducted by mobile phone 102 whenever the user of mobile phone 102 performs a given operation, such as changing the active interface and applications pack or such. This "re-analysis upon refresh" of mobile phone 102 may take place if mobile phone 102 is connected to zone server computer 112.

At step 308, criteria for selecting content to send to the mobile phone 102 are selected. Zone server computer 112 may, based on the profile defined in step 306, determine what content (e.g. content provided by customer intelligence platform 114, base marketing warehouse 116, backend processing queue 118, and/or content management system 120) to select and provide to the mobile phone 102.

At step 310, zone server computer 112 may dynamically (e.g. in real-time) assemble the selected content for the mobile service subscriber. At step 312, zone server computer 112 may provide the selected content to the mobile phone 102.

At step 314, zone server computer 112 may monitor the mobile service subscriber's response to the received content. That is to say, when a mobile service subscriber receives content, the content may, for example, contain a link to a vendor's website. The mobile service subscriber may click on the link, go the vendor's website, and purchase a product from the vendor. In an embodiment, zone server computer 112 may monitor (e.g. track) and record this action in, for example, a database.

In step 316, zone server computer 112 may provide information regarding the mobile service subscriber's response that it has captured above in step 314 to the content provider that provided the content that the mobile service subscriber responded to. In other words, once the content has been sent to the mobile service subscriber, and the mobile service subscriber has responded (even if the response was to ignore the content), this information may be provided to the entity that provided the content, so that the content provider may determine the success of the content (e.g. if the content was intended to induce a particular response from a mobile service subscriber, did the content elicit the desired response). This information may be used by a content provider to modify their content to improve the effectiveness of the content.

Figure 3:
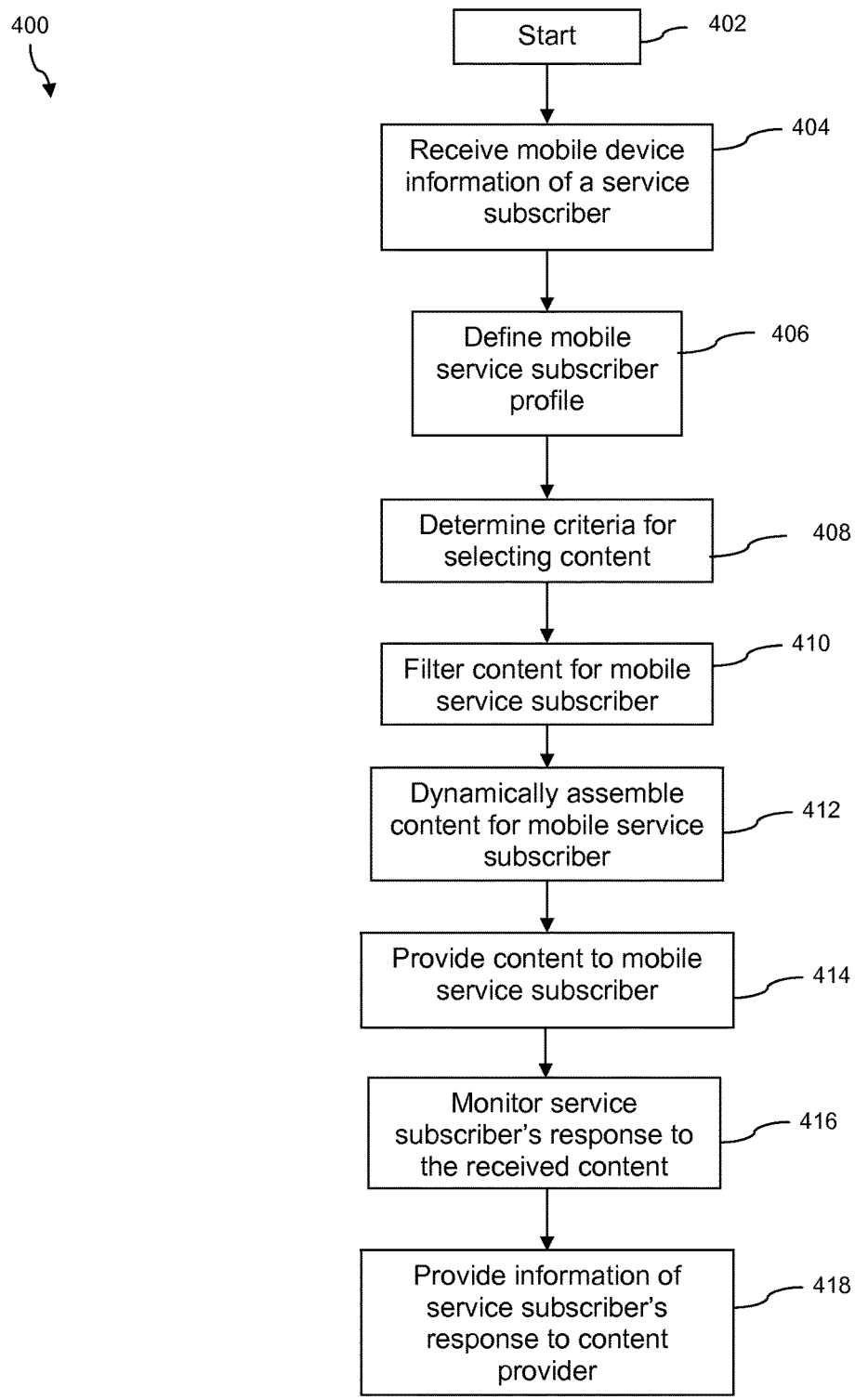
FIG. 3 illustrates a flowchart of a method, according to an embodiment of the disclosure.

FIG. 3 illustrates a method 400. At step 402, the method begins. At step 404, zone server computer 112 receives information of a mobile service subscriber, as described in step 304, herein above. At step 406, as in step 306 above, a profile is defined for the mobile service subscriber. At step 408, criteria for selecting content for the mobile phone 102 is determined, similar to step 308, above.

At step 410, content for the mobile phone 102 is filtered. For example, zone server computer 112 and/or content management system 120 may filter content stored in a data store such as base marketing warehouse 116. The filtering may be based on the criteria determined in step 408, and may thereby provide for the selection of content for delivering to the mobile phone 102 by filtering out the content that does not meet the criteria. In this manner, similar to methods described herein above, content targeted specifically to a mobile service subscriber and/or a group of mobile service subscribers may be dynamically generated. At step 412, as in step 310, herein above, the content may be dynamically assembled and in step 414, the content is delivered to the mobile phone 102.

Dynamically generating content may offer the ability to provide a customer (e.g. a mobile service subscriber) with content that is more current and more accurately reflects the frequently-changing nature of the customer's likes/dislikes, current activity, current focus, or such in a way that may allow a mobile service provider to better personalize the customer's experience. This may thereby generate a more positive experience for the customer.

This is in contrast to a scenario in which a static profile for a customer (e.g. a mobile service subscriber) is maintained in a database to be retrieved when a mobile service subscriber connects to, for example, a website. This profile may be updated from time to time based on some criteria, and may be held in a static state in the database. For example, a mobile service subscriber may visit a website such as a website associate with a retail establishment (e.g. www-.BookSellingWebsite.com). This website may have stored a profile of the mobile service subscriber based on the mobile service subscriber's last visit or last several visits to the www.BookSellingWebsite.com website. It may not, however, take into account any changes in the mobile service subscriber's profile that have taken place since the last visit. The content may also not reflect the current status of the mobile device that the mobile service subscriber is connecting via if, for example, the mobile service subscriber has acquired a new mobile device since the last time they visited the website. Nonetheless, the website may retrieve the store profile for the mobile service subscriber and may present content to a mobile service subscriber, based on this historical profile. In this "static profile scenario", content that is not reflective of the current status of the mobile service subscriber may be presented, which may not be appropriate, given any changes to the mobile service subscriber's status and/or their current mobile device.

Dynamically targeting and/or selecting content based on the current information of the mobile service subscriber may generate an improved bond between the mobile service subscriber and the mobile service provider, which may in turn strengthen the customer loyalty of the mobile service subscriber to the mobile service provider, and may in turn improve the mobile service provider's market share and/or customer base.

In addition, providing feedback regarding how a service subscriber reacts to (e.g. what they do in response to receiving) content to a content provider may help the content provider better design their content to achieve the response they desire.

Figure 4:
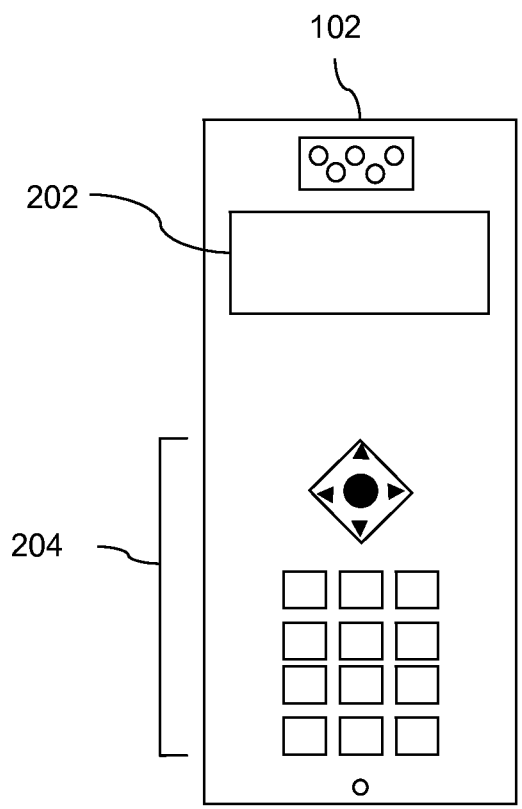
FIG. 4 illustrates a mobile device, according to an embodiment of the disclosure.

FIG. 4 depicts the mobile device 102, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, or a media player. The mobile device 102 includes a display 202 and a touch-sensitive surface and/or keys 204 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102. The mobile device 102 may execute a web browser application which enables the display 202 to show a web page. The web page may be obtained via wireless communications with a base transceiver station, a wireless network access node, a peer mobile device 102 or any other wireless communication network or system.

Figure 5:
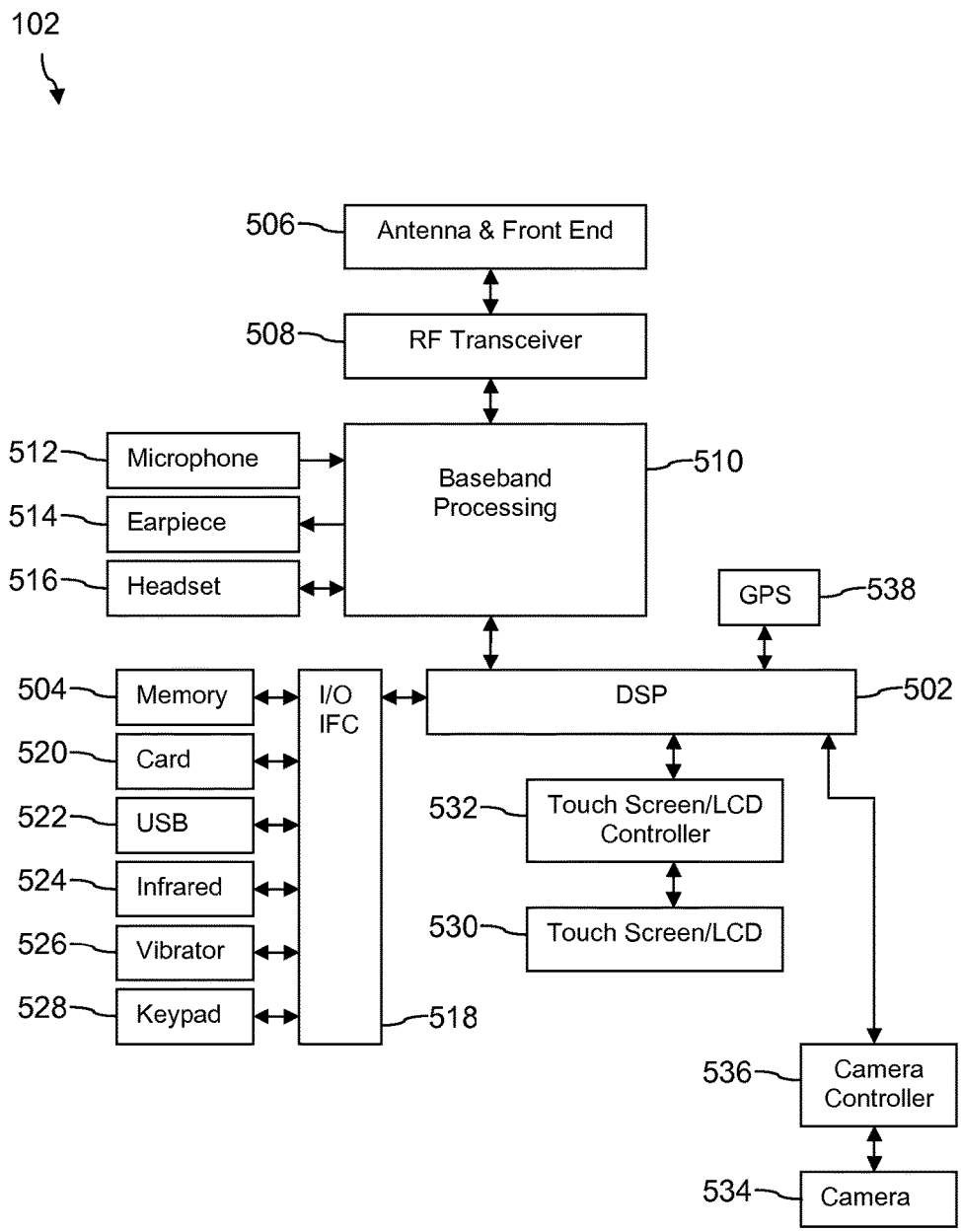
FIG. 5 illustrates a block diagram of a handheld mobile device, according to an embodiment of the disclosure.

FIG. 5 shows a block diagram of mobile device 102. While a variety of known components of handsets are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 102 may include another kind of display that does not provide a touch sensitive screen. In an embodiment, the DSP 502 may communicate directly with the memory 504 without passing through the input/output interface 518. Additionally, in an embodiment, the mobile device 102 may comprise other peripheral devices that provide other functionality.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth® interface or an IEEE 802.11 compliant wireless interface may enable the mobile device 102 to communicate wirelessly with other nearby handsets and/or wireless base stations.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 102 to determine its position.

Figure 6A:
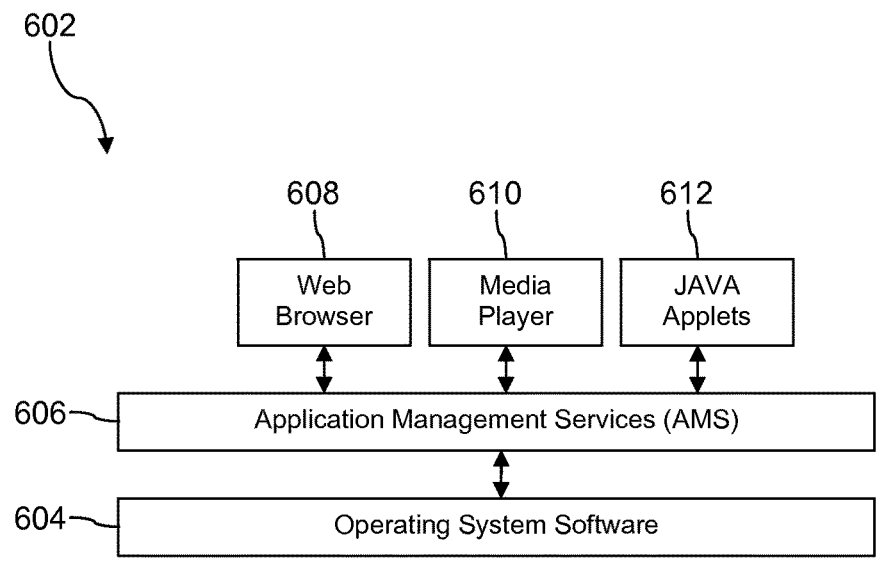
FIGS. 6a and 6b illustrate block diagrams of software environments, according to embodiments of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 102. Also shown in FIG. 6A are a web browser application 608, a media player application 610, and JAVA applets 612. The web browser application 608 may be executed by the mobile device 102 to browse content and/or the Internet, for example when the mobile device 102 is coupled to a network via a wireless link. The web browser application 608 may permit a user to enter information into forms and select links to retrieve and view web pages. The media player application 610 may be executed by the mobile device 102 to play audio or audiovisual media. The JAVA applets 612 may be executed by the mobile device 102 to provide a variety of functionality including games, utilities, and other functionality.

Figure 6B:
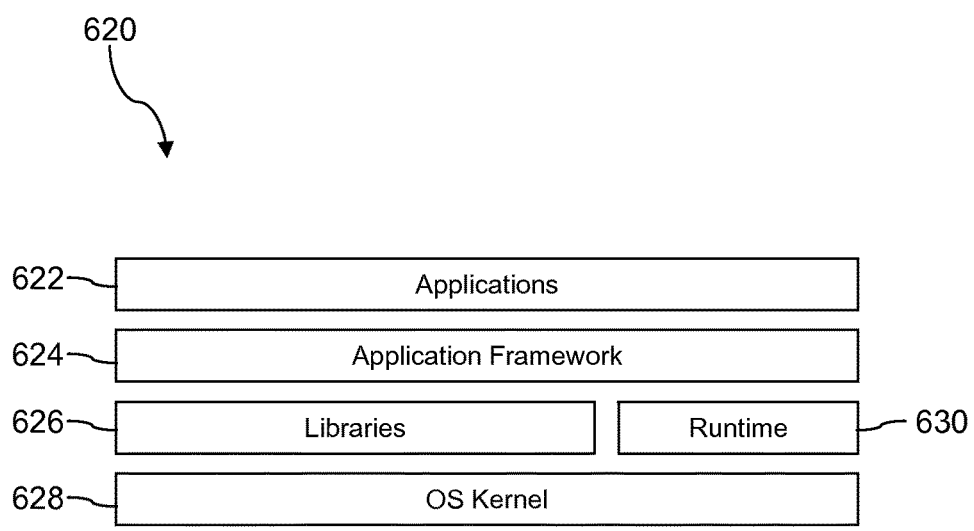

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
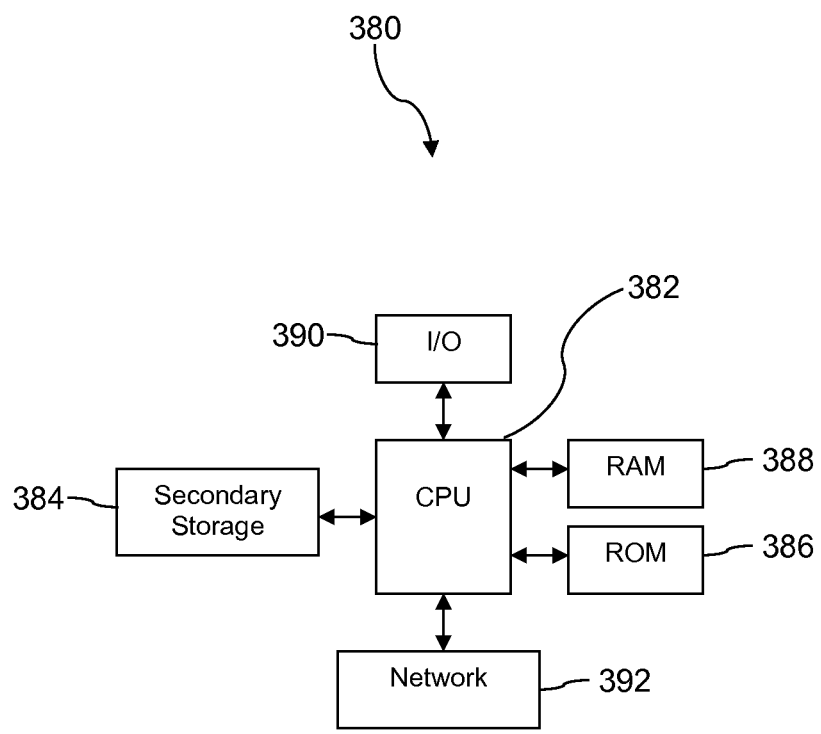
FIG. 7 illustrates a computer system suitable for implementing several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing targeted dynamically-assembled content to a mobile device used by a mobile service subscriber, the method comprising:

receiving, by a server computer, information about a mobile service subscriber and a mobile device that is connecting to the server computer, the mobile device having a plurality of interface and applications packs installed on the mobile device, wherein each interface and applications pack of the plurality of interface and applications packs comprises an automatic self-installation routine and an aggregated set of at least two of an individual application, an individual web widget, or an individual media file associated with a common theme, obtained based on a single user selection of the interface and applications pack, and installed using the automatic self-installation routine, and wherein each interface and applications pack of the plurality of interface and applications packs provides one or more encapsulated controls that invoke one or more functions provided in firmware of the mobile device;

determining, by the server computer, which interface and applications pack of the plurality of interface and applications packs is currently active on the mobile device based on the information, wherein the currently active interface and applications pack is currently in use on the mobile device;

determining, by the server computer, a mobile service subscriber profile and a selection criteria based on the information;

selecting and dynamically assembling, by the server computer, third party content based on the selection criteria and the currently active interface and applications pack;

providing the third party content to the mobile device independently of the currently active interface and applications pack;

monitoring a mobile service subscriber response to receiving the third party content; and providing information about the mobile service subscriber profile, the third party content, and the mobile service subscriber response of the mobile service subscriber to a content provider.

2. The method of claim 1, further comprising targeting content to a plurality of mobile devices based on commonalities in profiles of a plurality of service subscribers associated with the plurality of mobile devices.

3. The method of claim 1, further comprising monitoring a usage of the mobile device.

4. The method of claim 3, further comprising modifying the mobile service subscriber profile based on the monitoring of the usage of the mobile device.

5. The method of claim 1, wherein the information of the mobile device includes at least one of an indication of installed interface and applications packs on the mobile device, an indication of the currently active interface and applications pack on the mobile device, a network access identifier of the mobile device, a make of the mobile device, a model of the mobile device, a version of the mobile device, or an operating system of the mobile device.

6. The method of claim 1, wherein providing the third party content further includes tailoring an appearance of the third party content based on the information of the mobile service subscriber.

7. The method of claim 1, wherein the information of the mobile device is analyzed each time the mobile device connects to the server computer.

8. The method of claim 1, wherein at least one of the plurality of interface and applications packs is produced by a retail outlet or a media business.

9. The method of claim 1, wherein a portion of the self-installation routine for at least one of the plurality of interface and applications packs at least one of initializes or provisions voice-mail changes.

10. A system for providing targeted content to a mobile device associated with a mobile service subscriber comprising:
    at least one computer;
    a content management system operable to manage content from a content provider;
    a backend processing queue operable to process executable markup language information related to a mobile service subscriber;
    a base marketing warehouse operable to store the processed executable markup language information;
    a customer intelligence platform operable to process information of the mobile service subscriber and send the processed information to the base marketing warehouse; and
    a zone server operable to
    accept connections from a mobile device,
    receive information of the mobile service subscriber from the mobile device, the mobile device having a plurality of interface and applications packs installed on the mobile device, wherein each interface and applications pack of the plurality of interface and applications packs comprises an automatic self-installation routine and an aggregated set of at least two of an individual application, an individual web widget, or an individual media file associated with a common theme, obtained based on a single user selection of the interface and applications pack, and installed using the automatic self-installation routine, and wherein each interface and applications pack of the plurality of interface and applications packs provides one or more encapsulated controls that invoke one or more functions provided in firmware of the mobile device,
    determine which interface and applications pack of the plurality of interface and applications packs is currently active on the mobile device based on the information, wherein the currently active interface and applications pack is currently in use on the mobile device,
    accept a plurality of third party content from one or more of the content management system and the backend processing queue, wherein the plurality of third party content comprises executable markup language content,
    determine a selection criteria based on the information,
    select at least one third party content from the plurality of third party content based on the selection criteria and the currently active interface and applications pack,
    dynamically assemble the selected at least one third party content,
    transmit the dynamically assembled third party content to the mobile service subscriber device independently of the currently active interface and applications pack,
    monitor a response of the mobile service subscriber to receiving the dynamically assembled third party content, and
    provide information of the dynamically assembled third party content and the response of the mobile service subscriber to the content provider.

11. The system of claim 10, wherein the content management server further comprises a web portal for accepting content, and wherein the web portal is operable to accept one or more of in-house content and third-party content.

12. The system of claim 10, wherein the system further targets content to a plurality of mobile service subscribers based on commonalities in profiles of the plurality of mobile service subscribers.

13. The system of claim 10, wherein the content management system, the backend processing queue, the base marketing warehouse, the customer intelligence platform, and the zone server computer reside on one or more computer systems.

14. A method for filtering content to provide to a mobile device used by a mobile service subscriber comprising:
    receiving, by at least one server computer, information of a mobile service subscriber and a mobile device that is connecting to the at least one server computer, the mobile device having a plurality of interface and applications packs installed on the mobile device, wherein each interface and applications pack of the plurality of interface and applications packs comprises an automatic self-installation routine and an aggregated set of at least two of an individual application, an individual web widget, or an individual media file associated with a common theme, obtained based on a single user selection of the interface and applications pack, and installed using the automatic self-installation routine, and wherein each interface and applications pack of the plurality of interface and applications packs provides one or more encapsulated controls that invoke one or more functions provided in firmware of the mobile device;
    determining, by the at least one server computer, which interface and applications pack of the plurality of interface and applications packs is currently active on the mobile device based on the information, wherein the currently active interface and applications pack is currently in use on the mobile device;
    determining, by the at least one server computer, a mobile service subscriber profile and a selection criteria based on the information;
    filtering, by the at least one server computer, a plurality of third party content from a base marketing warehouse to be provided to the mobile service subscriber based on the selection criteria, wherein the plurality of third party content in the base marketing warehouse is provided by a content provider;
    selecting and dynamically assembling, by the at least one server computer, at least one third party content from the plurality of third party content based on the selection criteria and the currently active interface and applications pack;
    providing the dynamically assembled third party content to the mobile device independently of the currently active interface and applications pack;

monitoring a response of the mobile service subscriber to receiving the dynamically assembled third party content; and providing information about the mobile service subscriber profile, the dynamically assembled third party content, and the response of the mobile service subscriber to the content provider.

15. The method of claim 14, further comprising targeting content to a plurality of mobile service subscribers based on commonalities in mobile service subscriber profiles of the plurality of service subscribers.

16. The method of claim 14, further comprising monitoring a mobile device usage of the mobile service subscriber.

17. The method of claim 16, further comprising modifying the mobile service subscriber profile based on the monitoring the mobile device usage.

18. The method of claim 14, wherein the information of the mobile device includes at least one of a interface and applications pack installed on the mobile device, a network access identifier of the mobile device, a make of the mobile device, a model of the mobile device, a version of the mobile device, an operating system of the mobile device, or information of software installed on the mobile device.

19. The method of claim 14, wherein providing the dynamically assembled third party content further includes tailoring an appearance of the dynamically assembled third party content based on the information of the mobile service subscriber.

20. The method of claim 14, wherein the information of the mobile service subscriber is analyzed each time the mobile device connects to the at least one server computer or when the mobile device is refreshed while connected to the at least one server computer.

* * * * *